United States Patent
Mouri et al.

[11] Patent Number: 6,010,247
[45] Date of Patent: Jan. 4, 2000

[54] BEARING DEVICE

[75] Inventors: Yasuhiro Mouri; Shinichi Mori, both of Miyota-machi, Japan

[73] Assignee: Minebea Co., Ltd., Miyota-machi, Japan

[21] Appl. No.: 08/998,868

[22] Filed: Dec. 29, 1997

[30] Foreign Application Priority Data

May 14, 1997 [JP] Japan .................................. 9-139241

[51] Int. Cl.[7] .................................................. F16C 33/60
[52] U.S. Cl. ........................... 384/517; 384/501; 384/504
[58] Field of Search .................................. 384/499, 500, 384/501, 502, 504, 505, 506, 510, 512, 513, 517, 519, 537

[56] References Cited

U.S. PATENT DOCUMENTS

| | | | |
|---|---|---|---|
| 4,788,758 | 12/1988 | Gordon et al. ........................ | 384/537 X |
| 4,867,581 | 9/1989 | Schmidt et al. ........................ | 384/517 |
| 5,316,393 | 5/1994 | Daugherty ............................... | 384/517 |
| 5,547,291 | 8/1996 | Miyazaki et al. ....................... | 384/512 |
| 5,560,717 | 10/1996 | Obara et al. ............................ | 384/512 |

FOREIGN PATENT DOCUMENTS

| | | | |
|---|---|---|---|
| 235419 | 8/1994 | Japan ...................................... | 384/517 |
| 2279999 | 1/1995 | United Kingdom .................... | 384/504 |

*Primary Examiner*—Thomas R. Hannon
*Attorney, Agent, or Firm*—Oliff & Berridge, PLC

[57] ABSTRACT

A bearing device is used as a bearing for a pivot of a head stack assembly to thereby make a hard disc drive thin. Widths of first and second inner races 12a and 13a are set to be smaller than the widths of first and second outer races 12b and 13b. Even if first and second bearings 12 and 13 (outer races 12b and 13b) are mounted on a shaft 9 in contact with each other, a space S is formed between the first and second inner races 12a and 13a. From this structure, in the case where a pre-pressure is applied to the second inner race 13a, it is possible to adjust the pre-pressure in a wide range. In the prior art, it has been necessary to provide an annular projection or a spacer for keeping a space for application of the pre-pressure. However, the present invention makes possible to dispense with the annular projection or the spacer. Corresponding to this, the width of the bearing device 10 is shortened. Finally, the thickness of the pivot portion of the swing arm is decreased to thereby make the hard disc drive thin.

4 Claims, 11 Drawing Sheets

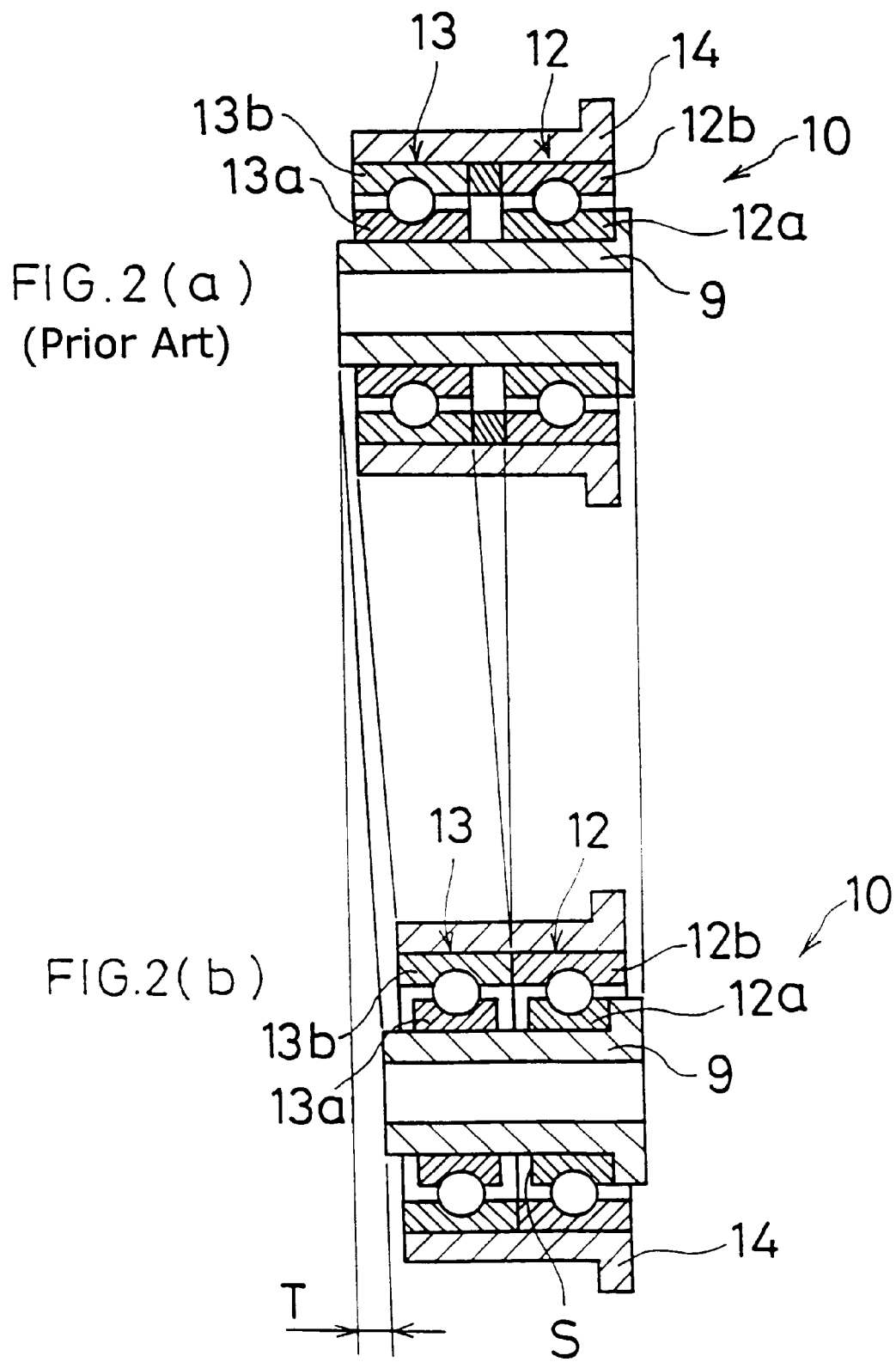

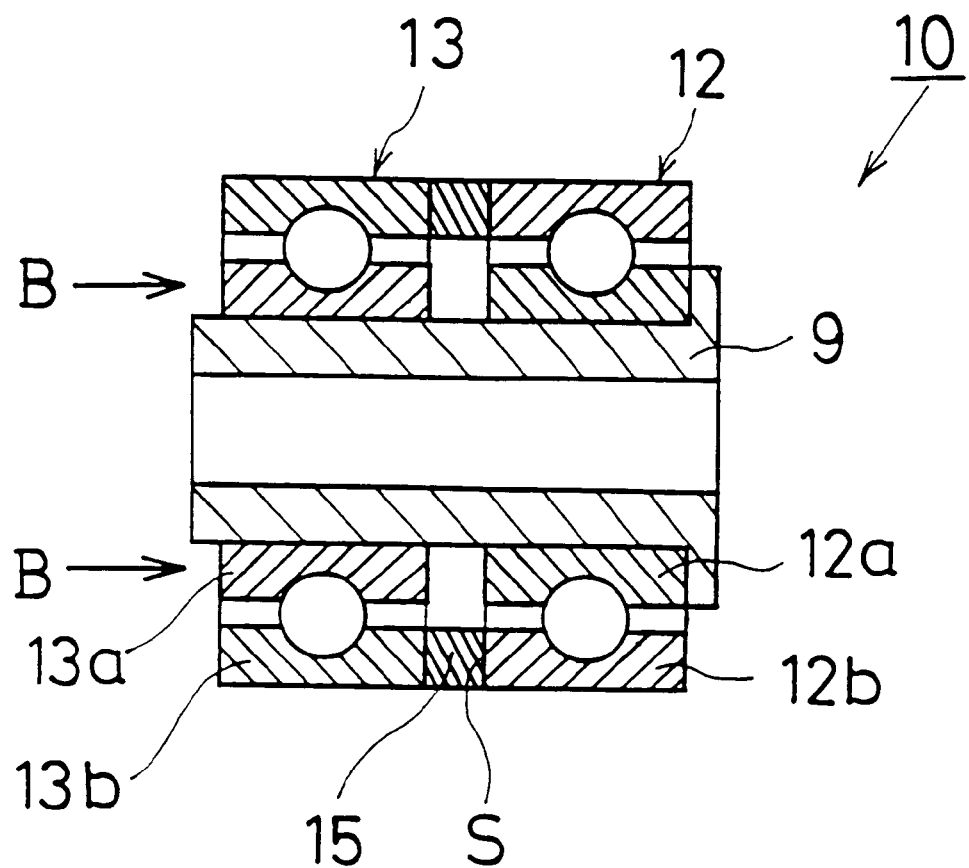

BEARING DEVICE

BACKGROUND OF THE INVENTION

1. Field of the Invention

The present invention relates to a bearing device used in a head stack assembly for angularly moving a swing arm of a hard disc drive.

2. Description of the Related Art

An example of a hard disc drive (HDD) shown in FIGS. 15 and 16 has been known. In FIGS. 15 and 16, the HDD 1 is essentially composed of a substantially rectangular box-shaped base (base plate) 2, a spindle motor 3 disposed on the base 2, and a head stack assembly (hereinafter referred to and initialized as HSA) 6 having a magnetic head 5 for writing information at a predetermined position of a magnetic disc 4 to be rotated by the spindle motor 3 and reading out the information from any desired position of the magnetic disc 4.

The HSA 6 is essentially composed of a swing arm 7 having the magnetic head 5 at its distal end, a bearing device 10 fitted in a cylindrical portion 8 provided in the swing arm 7 and having an inner race (to be described later) fitted around a shaft 9 mounted on the base 2 for supporting the swing arm 7 rotatably to the shaft 9, and a drive portion (voice coil) 11 for rotatably actuating the swing arm 7. As shown in FIG. 17, the shaft 9 is composed of a sleeve-like shaft body 9a and a flanged portion 9b formed at one end of the shaft body 9a. The shaft 9 is mounted on the base 2 with its flanged portion 9b being located on the side of the base 2.

As shown in FIG. 17, the bearing device 10 is essentially composed of two (hereinafter referred to as first and second for the sake of explanation) single-row deep groove ball bearings (hereinafter referred to as ball bearings for the sake of explanation) 12 and 13 fitted around the shaft 9 with a space S having a predetermined length and a sleeve 14. One end of an inner race 12a of the first ball bearing 12 (hereinafter referred to as a first inner race whereas an inner race of the second ball bearing 13 will hereinafter be referred to as a second inner race 13a) is in contact with the flanged portion 9b.

The sleeve 14 is essentially composed of a cylindrical sleeve body 14a, an annular projection 14b provided on the inner circumferential side of the sleeve body 14a and a flanged portion 14c formed at one end of the sleeve body 14a. The annular projection 14b of the sleeve 14 is inserted into the space S formed between outer races (hereinafter referred to as first and second outer races) 12b and 13b of the first and second ball bearings 12 and 13, whereby the sleeve 14 covers the first and second ball bearings 12 and 13 circumferentially and the flanged portion 14c is positioned at one end of the first ball bearing 12.

In order to obviate an axial displacement of the bearing device 10, for example, a pre-pressure is applied as shown in FIG. 17. Namely, under the condition that, as described above, the annular projection 14b is inserted into the space S between the first and second outer races 12b and 13b, the first and second outer races 12b and 13b are fixed to the inner surface of the sleeve body 14a with adhesives, and the first inner race 12a is fixed to the shaft 9 with adhesives. On the other hand, the second inner race 13a is fitted around the shaft 9 to be slidable. Thereafter, a pre-pressure from the direction indicated by the arrows B in FIG. 17 is applied to the outer end of the second inner race 13a. Under the condition that this pre-pressure is applied, the second inner race 13a is fixed to the shaft 9 with adhesives so as to obviate the generation of the axial displacement.

For reference, the annular projection 14b of the sleeve 14 is provided for the purpose of meeting such requirement that an interval should be needed in order to prevent the first and second ball bearings 12 and 13 from coming into contact with each other when the pre-pressure is applied thereto.

Also, as the other type of the bearing device 10, as shown in FIG. 18, instead of the above-described annular projection 14b, a spacer 15 which is discrete from the sleeve 14 may be provided.

Under the condition that the spacer 15 is inserted into the space S between the first and second outer races 12b and 13b, the first and second outer races 12b and 13b are fixed to the inner surface of the sleeve body 14a with adhesives, and the first inner race 12a is fixed to the shaft 9 with adhesives. On the other hand, the second inner race 13a is fitted around the shaft 9 to be slidable. Thereafter, a pre-pressure from the direction indicated by the arrows B in FIG. 18 is applied to the outer end of the second inner race 13a. Under the condition that this pre-pressure is applied, the second inner race 13a is fixed to the shaft 9 with adhesives, whereby the bearing device 10 shown in FIG. 18 may obviate the generation of the axial displacement. In this case, instead of the annular projection 14b, the spacer 15 may be used to prevent the contact between the first and second ball bearings 12 and 13 when the pre-pressure is applied thereto.

Also, as shown in FIG. 19, a bearing device 10 in which the sleeve 14 shown in FIG. 18 is dispensed with may be used as another type bearing device.

In the bearing device 10 shown in FIG. 19, under the condition that the spacer 15 is inserted into the space S between the first and second outer races 12b and 13b, the first and second outer races 12b and 13b are held in place, and the first inner race 12a is fixed to the shaft 9 with adhesives. On the other hand, the second inner race 13a is fitted around the shaft 9 to be slidable. Thereafter, a pre-pressure from the direction indicated by the arrows B in FIG. 19 is applied to the outer end of the second inner race 13a. Under the condition that this pre-pressure is applied, the second inner race 13a is fixed to the shaft 9 with adhesives, whereby the bearing device 10 shown in FIG. 19 may obviate the generation of the axial displacement.

For reference, as another example in the conventional art, in which the above-described spacer 15 and annular projection 14b are dispensed with, a duplex bearing has been used. This duplex bearing has such a structure that two inner races and two outer races are brought into contact with each other, respectively, when the pre-pressure is applied thereto. From this structure, an amount of the pre-pressure to be applied is determined in accordance with the manufacturing precision of the bearing, therefore, it is difficult to perform the control of the pre-pressure amount. This is inconvenient. Also, in the case where this duplex bearing is used as the bearing for the pivot of the above-described HSA 6, whenever the pre-pressure amount must be changed, the duplex bearing should be redesigned. It is difficult to actually use this type bearing as the bearing for the pivot of the HSA 6.

However, recently, a portable type personal computer or the like has been miniaturized and made thin, and also an HDD that is a recording device having a large capacity used in the portable type personal computer or the like is demanded to be miniaturized or made thin.

The miniaturization of the HDD may be coped with by making the diameter of the magnetic disc small from 3.5 inches to 2.5 inches or 1.8 inches. Also, the miniaturization of the bearing (bearing device) for the pivot of the HSA used in the interior of such HDD may be coped with by decreasing the diameter of locus races (outer races and inner races).

Incidentally, in order to meet the requirement for the making-thin, it is necessary to shorten a width of the bearing (for example, in the vertical direction in FIG. 16) for the pivot of the HSA.

However, as a matter of fact, the mere selection of the bearing having a shorter width could not suitably meet the recent strong requirement for the super thinned type size for the super thinned card type HDD.

SUMMARY OF THE INVENTION

In view of the foregoing defects, an object of the present invention is to provide a bearing device which is to be used as a bearing for a pivot of a head stack assembly to thereby make a hard disc drive thin.

In an invention of the claim 1, a bearing device composed of a plurality of bearings, each of which has an outer race, an inner race and a ball held between the two races, which are aligned in the axial direction of a shaft to which the bearings are to be mounted, wherein the improvement resides in that either the outer races or the inner races of the respective bearings are bonded to each other and the races which are not bonded have a spacing therebetween.

In to an invention of the claim 2, the bearing device according to the claim 1, wherein at least a width of the outer race or the inner race, which is positioned separately with each other, is the same dimension measured from the ball.

In an invention of the claim 3, the bearing device according to the claim 1, wherein a width of at least the outer race or the inner race, which is positioned separately with each others measured from the inner end of the races to the ball is shorter than a width measured from the outer end of the races to the ball.

BRIEF DESCRIPTION OF THE DRAWINGS

In the accompanying drawings:

FIG. 2 is a view showing the comparison between the present invention and the prior art;

FIG. 19 is a cross-sectional view showing still another example of a conventional bearing device.

DETAILED DESCRIPTION OF THE PREFERRED EMBODIMENTS

Figure 15:
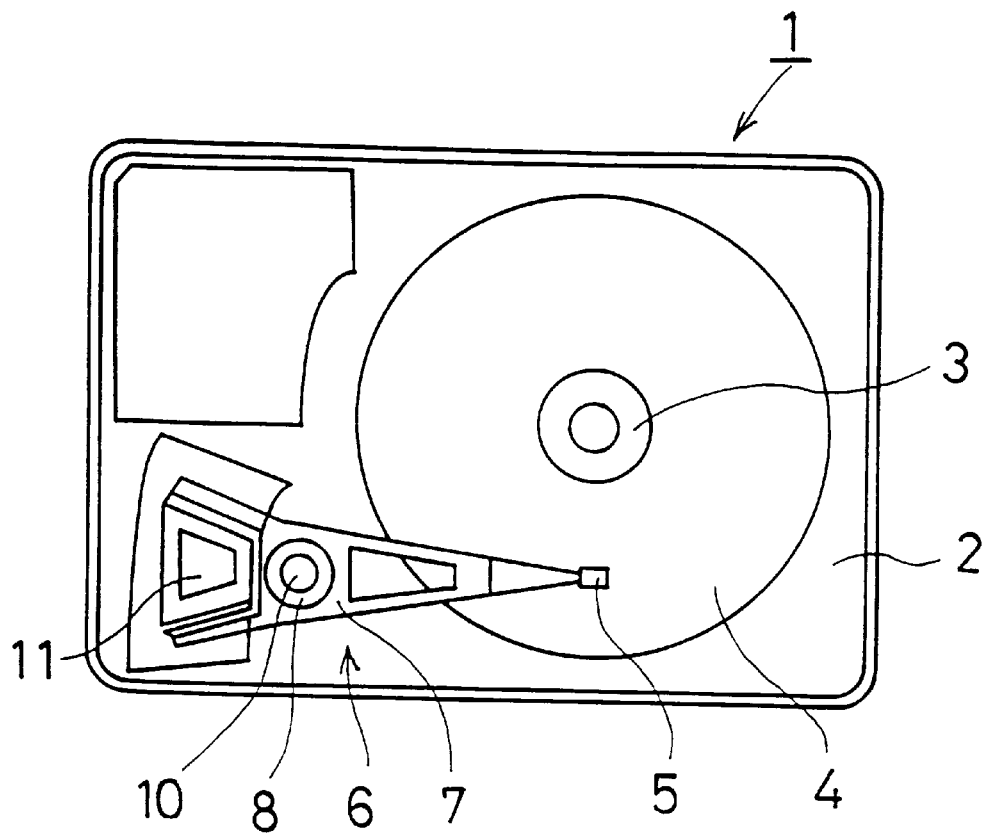
FIG. 15 is a plan view showing an HDD.
Figure 16:
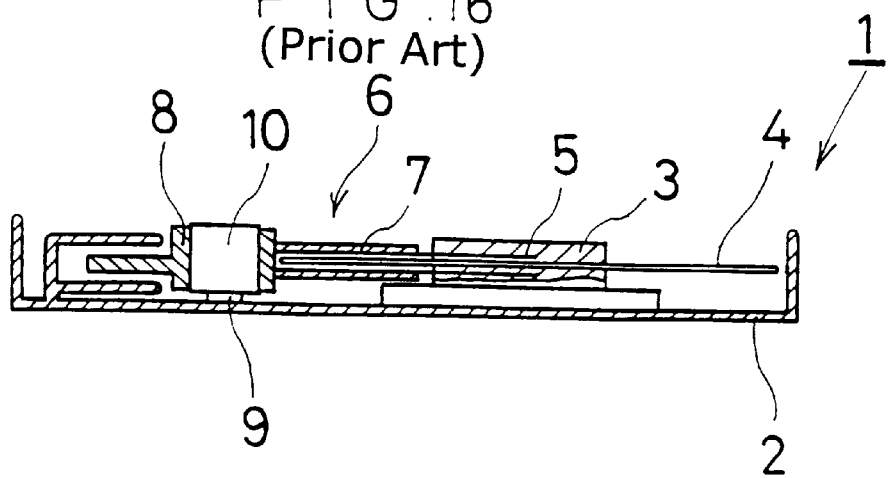
FIG. 16 is a cross-sectional view showing the HDD shown in FIG. 15.

A bearing device 10 according to a first embodiment of the invention will now be described on the basis of FIG. 1 with reference to FIGS. 15 and 16.

Figure 1:
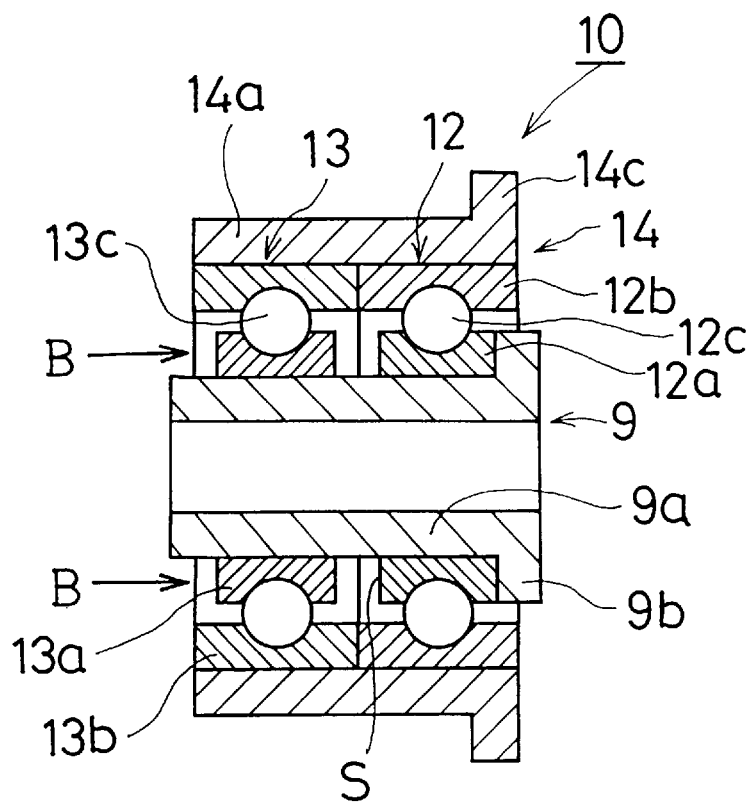
FIG. 1 is a cross-sectional view showing a bearing device according to a first embodiment of the invention.

In FIG. 1, the bearing device 10 is essentially composed of first and second ball bearings 12 and 13 fitted around a shaft 9 and a sleeve 14 fitted around the first and second outer races 12b and 13b. The lengths in the axial direction of the first and second outer races 12b and 13b are set at substantially the same. On the other hand, the widths of first and second inner races 12a and 13a are set at smaller than the widths of the first and second outer races 12b and 13b. In this case, the reduction of the widths of the first and second inner races 12a and 13a is performed by shortening the widths of the inner races (first and second inner races 12a and 13a) toward the balls (rolling members) 12c and 13c of the first and second bearings 12 and 13 as the centers.

The above-described first and second ball bearings 12 and 13 are fitted around the shaft 9 in a state that the first and second outer races 12b and 13b are brought into contact with each other, and one end portion on the side of the first inner race 12a (outer end) is brought into contact with a flanged portion 9b of the shaft 9.

In this bearing device 10, under the condition that the first and second outer races 12b and 13b are brought into contact with each other, the first and second outer races 12b and 13b are fixed to the inner surface of the sleeve body 14a with adhesives, and the first inner race 12a is fixed to the shaft 9 with adhesives. On the other hand, the second inner race 13a is fitted around the shaft 9 to be slidable. Thereafter, a pre-pressure from the direction indicated by the arrows B in FIG. 1 is applied to the outer end of the second inner race 13a. Under the condition that this pre-pressure is applied, the second inner race 13a is fixed to the shaft 9 with adhesives, whereby the bearing device 10 may obviate the generation of the axial displacement.

In the thus constructed bearing device 10, since the widths of the first and second inner races 12a and 13a are set at smaller than the widths of the first and second outer races 12b and 13b, even if the first and second ball bearings 12 and 13 are mounted to the shaft 9 in contact with each other, the space S is formed between the first and second inner races 12a and 13a. From this structure, in the case where the pre-pressure is applied to the second inner race 13a, it is possible to adjust the pre-pressure amount to be applied in a wide range. Also, although, in the conventional art shown in FIGS. 17 to 19, in order to keep the space S for the pre-pressure application, the annular projection 14b or the spacer 15 is provided, in the embodiment of the present invention, it is possible to dispense with the annular projection 14b or the spacer 15. Accordingly, corresponding to this, it is possible to shorten the width of the bearing device 10 itself. Finally, the thickness of the pivot portion of the swing arm 7 is shortened to improve the thin state of the HDD 1.

The embodiment and the prior art are shown for comparison in FIG. 2. A part (a) shown in FIG. 2 denotes the bearing device 10 of FIG. 18, and a part (b) shown therein denotes the device according to the embodiment of the present invention. In the embodiment shown in the part (b), it is possible to shorten the width of the bearing device 10 itself at a predetermined amount T as described above. Accordingly, it is possible to make the shaft 9 thin, similarly the HDD 1

Figure 3:
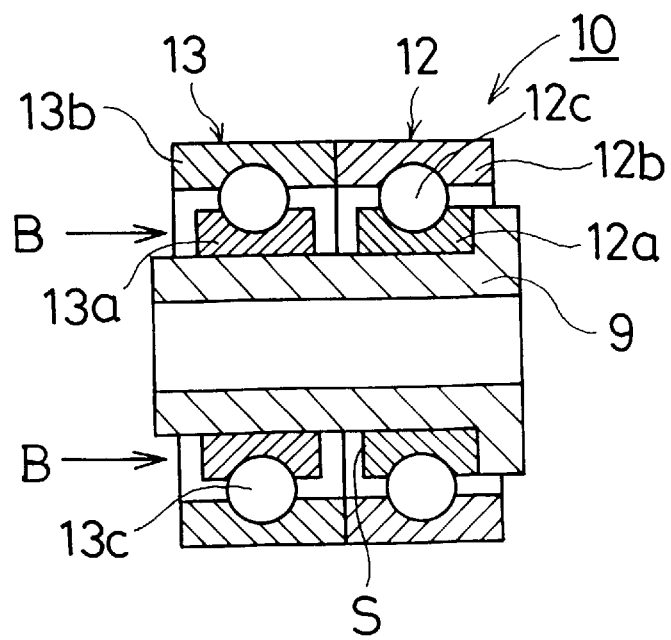
FIG. 3 is a cross-sectional view showing a bearing device according to a second embodiment of the invention.

Although the above-described bearing device 10 of FIG. 1 is of a type in which the sleeve 14 is provided, it is possible to make the bearing devive 10 (second embodiment) by omitting the provision of the sleeve 14 used in FIG. 1 as shown in FIG. 3 in place of the bearing device 10 of FIG. 1.

In the bearing device 10 (second embodiment) of FIG. 3, under the condition that the first and second outer races 12b and 13b are brought into contact with each other, the first and second outer races 12b and 13b are held to the shaft 9, and the first inner race 12a is fixed to the shaft 9 with adhesives. On the other hand, the second inner race 13a is fitted around the shaft 9 to be slidable. Thereafter, a pre-pressure from the direction indicated by the arrows B in FIG. 3 is applied to the outer end of the second inner race 13a. Under the condition that this pre-pressure is applied, the second inner race 13a is fixed to the shaft 9 with adhesives, whereby the bearing device 10 shown in FIG. 3 may obviate the generation of the axial displacement.

In thus constructed bearing device 10, a space S is formed between the first and second inner races 12a and 13a in the same manner as the bearing device 10 shown in FIG. 1. It is possible to dispense with the annular projection 14b or the spacer 15, which has been needed in the prior art. Accordingly, corresponding to this, it is possible to shorten the width of the bearing device 10. Finally, the thickness of the pivot portion of the swing arm 7 is decreased to improve the thin state of the HDD 1.

In the bearing device 10 shown in FIG. 1 or FIG. 3, the reduction of the widths of the first and second inner races 12a and 13a is performed by shortening the width of the first and second inner races 12a and 13a toward the respective balls (rolling members) 12c and 13c of the first and second bearings 12 and 13. However, instead of this, as shown in FIG. 4, it is possible to form a bearing device 10 (third embodiment) by shortening only the side portions 12d and 13d facing with each other of the first and second inner races 12a and 13a.

Figure 4:
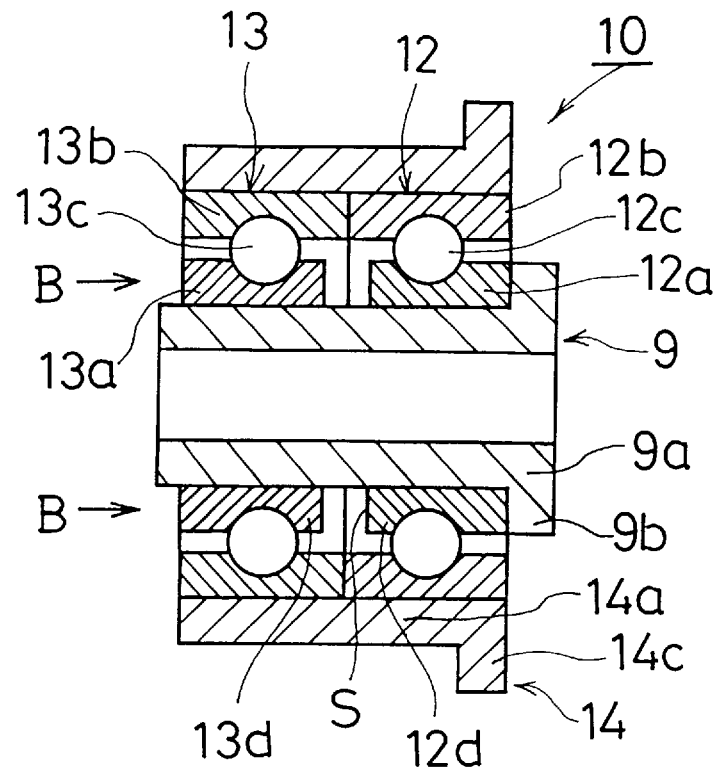
FIG. 4 is a cross-sectional view showing a bearing device according to a third embodiment of the invention.

In the bearing device 10 (third embodiment) of FIG. 4, in the same manner as in the first embodiment described above, a space S is formed between the first and second inner races 12a and 13a. In the case where the pre-pressure is applied in the direction indicated by the arrows B to the second inner race 13a, it is possible to adjust the pre-pressure amount in a wide range. Accordingly, it is possible to dispense with the annular projection 14b or the spacer, which has been needed in the prior art. Corresponding to this, it is possible to shorten the width of the bearing device 10. Finally, the thickness of the pivot portion of the swing arm 7 is decreased to improve the thin state of the HDD 1.

Figure 5:
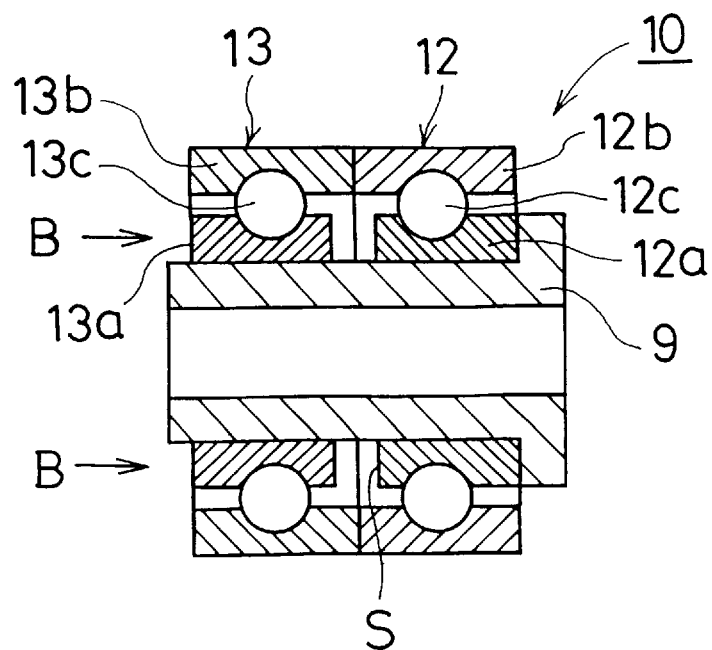
FIG. 5 is a cross-sectional view showing a bearing device according to a fourth embodiment of the invention.

It is possible to form a sleeveless type bearing device (fourth embodiment) as shown in FIG. 5 by dispensing with the sleeve 14 of the above-described bearing device 10 shown in FIG. 4.

In the bearing device 10 (forth embodiment) of FIG. 5, also in the same manner as in the first to third embodiments described above, it is possible to dispense with the annular projection 14b or the spacer 15, which has been needed in the prior art. Accordingly, corresponding to this, it is possible to shorten the width of the bearing device 10. Finally, the thickness of the pivot portion of the swing arm 7 is shortened to improve the thin state of the HDD 1.

Also, in the above-described first through fourth embodiments, the cases where the widths of the first and second inner races 12a and 13a are reduced are exemplified. However, instead of the above, as shown in FIG. 6, it is possible to form the bearing device 10 (fifth embodiment) by reducing the widths of only the first inner race 12a toward the balls 12c and 13c.

Figure 6:
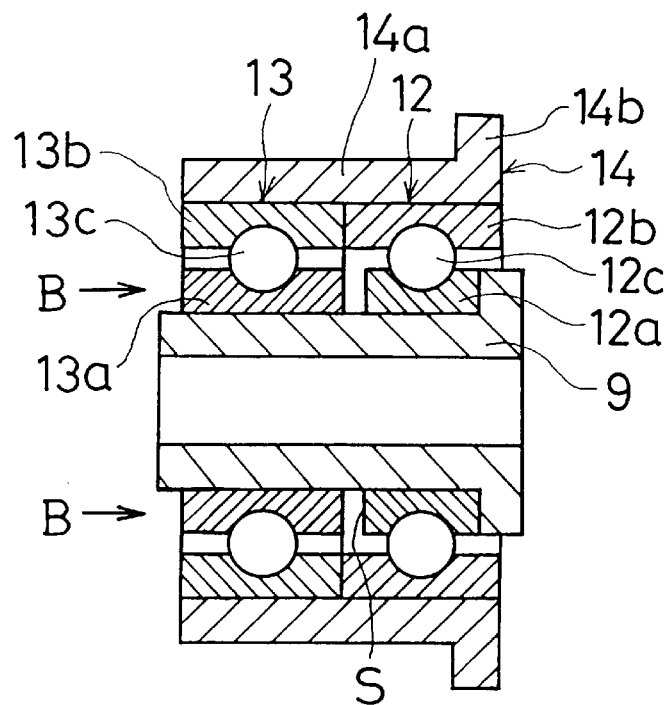
FIG. 6 is a cross-sectional view showing a bearing device according to a fifth embodiment of the invention.

Also, in the bearing device 10 (fifth embodiment) of FIG. 6, in the same manner as in the first to fourth embodiments described above, a space S is secured between the first and second inner races 12a and 13a, and it is possible to dispense with the annular projection 14b or the spacer 15, which has been needed in the prior art. Accordingly, corresponding to this, it is possible to shorten the width of the bearing device 10. Finally, the thickness of the pivot portion of the swing arm 7 is decreased to improve the thin state of the HDD 1.

Figure 7:
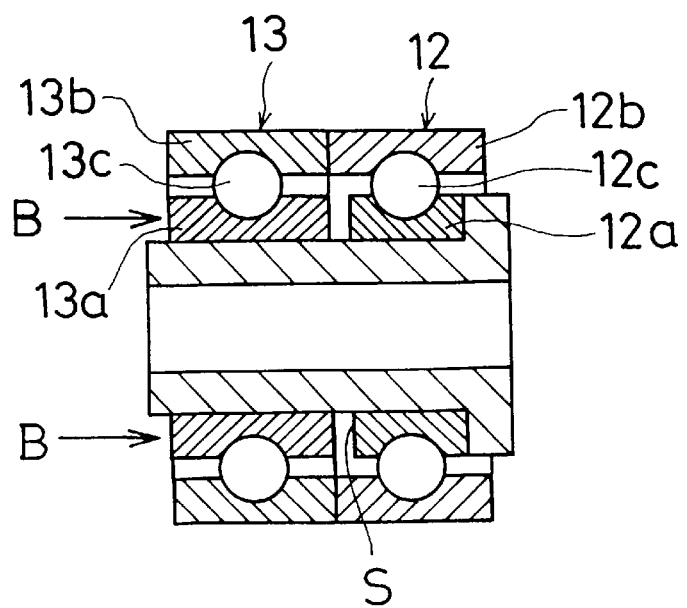
FIG. 7 is a cross-sectional view showing a bearing device according to a sixth embodiment of the invention.

It is possible to form a sleeveless type bearing device 10 (sixth embodiment) as shown in FIG. 7, by dispensing with the sleeve 14 of the above-described bearing device 10 shown in FIG. 6.

In the bearing device 10 (fifth embodiment) of FIG. 7, also in the same manner as the first to fifth embodiments described above, a space S is secured between the first and second inner races 12a and 13a, and it is possible to dispense with the annular projection 14b or the spacer 15, which has been needed in the prior art. Accordingly, corresponding to this, it is possible to shorten the width of the bearing device 10. Finally, the thickness of the pivot portion of the swing arm 7 is decreased to improve the thin state of the HDD 1.

Also, in the above-described fifth or sixth embodiment, a case where the width of the first inner race 12a is reduced about the ball 12c as a center is exemplified. However, instead of this, as shown in FIG. 8, a width of a portion 12d may be reduced toward the side of the second inner race 13a of the first inner race 12a to thereby form a bearing device 10 (seventh embodiment).

Figure 8:
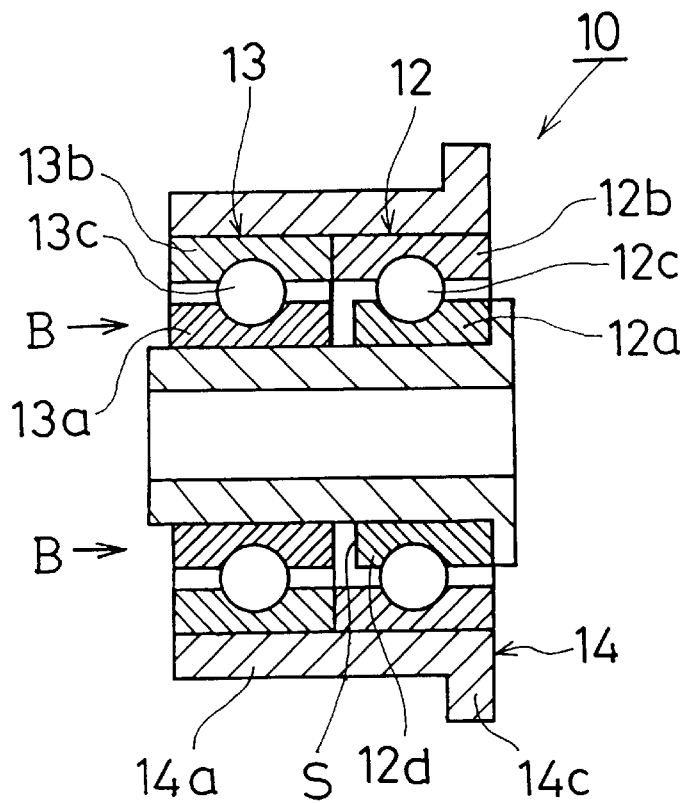
FIG. 8 is a cross-sectional view showing a bearing device according to a seventh embodiment of the invention.
Figure 9:
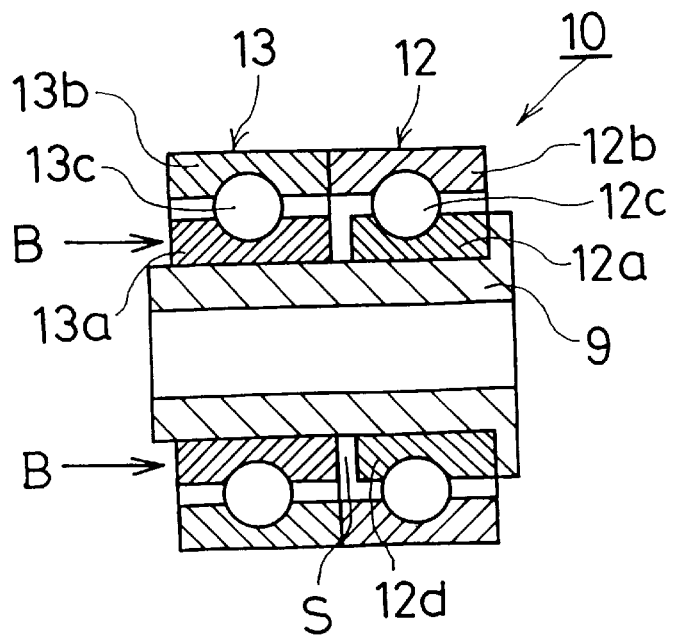
FIG. 9 is a cross-sectional view showing a bearing device according to an eighth embodiment of the invention.

It is also possible to form a sleeveless type bearing device 10 (eighth embodiment) as shown in FIG. 9, by dispensing with the sleeve 14 of the above-described bearing device 10 shown in FIG. 8.

In the embodiments from the first to eight embodiments, the widths of the first and second inner races 12a and 13a and the dimension of the first inner race 12a are reduced. Instead thereof, as shown in FIGS. 10, 11, 12 and 13, it is possible to form bearing devices 10 by reducing the widths of the outer races.

Figure 10:
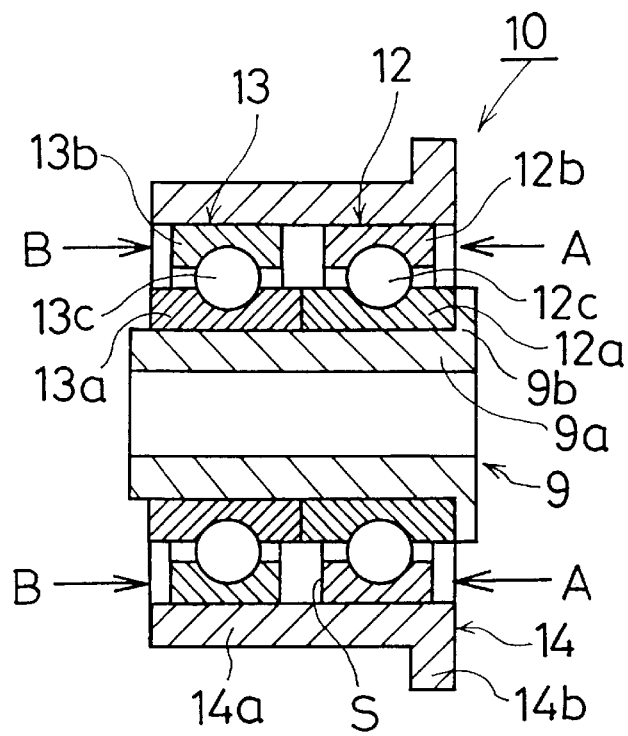
FIG. 10 is a cross-sectional view showing a bearing device according to a ninth embodiment of the invention.

In the bearing device 10 (ninth embodiment) shown in FIG. 10, the widths of the first and second inner races 12a and 13a are set at the same one. On the other hand, the widths of the first and second outer races 12b and 13b are set at smaller ones compared with the widths of the first and second inner races 12a and 13a. In this case, the reduction of the widths of the first and second outer races 12b and 13b is performed by reducing the widths on both sides of the outer races about the balls 12c and 13c as the centers.

In the bearing device 10 (ninth embodiment), the first and second outer races 12b and 13b are held to be slidable to the sleeve body 14a. Under the condition that the outer end on the side of the first inner race 12a is brought into contact with the flanged portion 9b of the shaft 9, and the first and second inner races 12a and 13a are brought into contact with each other, the first and second inner races 12a and 13a are fitted around the shaft 9 and are fixed to the shaft 9 with the adhesives. Thereafter, a pre-pressure from the direction indicated by the arrows A and B in FIG. 10 is applied to the outer ends of the first and second outer races 12b and 13b. Under the condition that this pre-pressure is applied, the first and second outer races 12b and 13b are fixed to the sleeve body 14a with adhesives, whereby the bearing device 10 shown in FIG. 10 may obviate the generation of the axial displacement.

In the thus constructed bearing device 10, the widths of the first and second outer races 12b and 13b are set at smaller ones than the widths of the first and second inner races 12a and 13a. The space S is formed between the first and second outer races 12b and 13b even if the first and second ball bearings 12 and 13 are mounted to the shaft 9 in contact with each other. From this structure, it is possible to adjust the pre-pressure in a wide range in the case where the pre-pressure is applied to the first and second outer races 12b and 13b. In the above-described prior art shown in FIGS. 17 to 19, in case of the application of the pre-pressure, the annular projection 14b provided around the sleeve 14 or the spacer 15 is used for maintaining the space S. However, in the embodiment, it is possible to dispense with the annular projection 14b or the spacer 15. Accordingly, corresponding to this, it is possible to shorten the width of the bearing device 10. Finally, the thickness of the pivot portion of the swing arm 7 is shortened to improve the thin state of the HDD 1.

Figure 11:
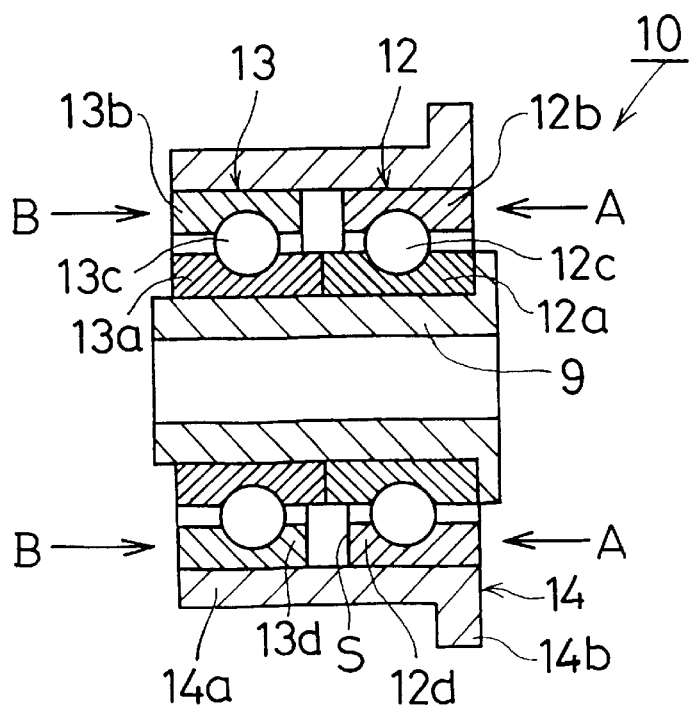
FIG. 11 is a cross-sectional view showing a bearing device according to a tenth embodiment of the invention.

Although the reduction of the widths of the first and second outer races 12b and 13b in the bearing device 10 of FIG. 10 is performed by shortening the widths of the outer races toward the balls 12c and 13c, instead thereof, as shown in FIG. 11, only the widths of the portions 12d and 13d of the first and second outer races 12b and 13b facing each other may be decreased to form a bearing device 10 (tenth embodiment).

In the bearing device 10 (tenth embodiment) of FIG. 11, a space S is formed between the first and second outer races 12b and 13b in the same manner as the ninth embodiment described above. In the case where the pre-pressure is applied in the direction indicated by the arrows A and B to the first and second outer races 12b and 13b, it is possible to adjust the pre-pressure amount in a wide range. Accordingly, it is possible to dispense with the annular projection 14b or the spacer 15, which has been needed in the prior art. Corresponding to this, it is possible to shorten the width of the bearing device 10. Finally, the thickness of the pivot portion of the swing arm 7 is decreased to improve the thin state of the HDD 1.

Also, in the above-described ninth or tenth embodiment, the cases where the widths of the first and second outer races 12b and 13b are reduced are exemplified. However, instead thereof, as shown in FIG. 12, it is possible to form a bearing device 10 (eleventh embodiment) by shortening only the width of the first outer race 12b toward the ball 12c.

Figure 12:
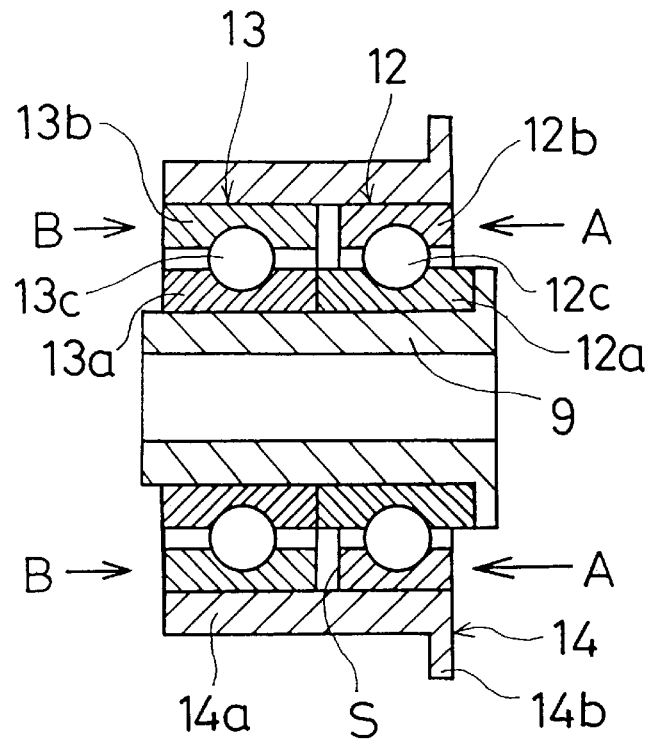
FIG. 12 is a cross-sectional view showing a bearing device according to an eleventh embodiment of the invention.

In the bearing device 10 (eleventh embodiment) of FIG. 12, a space S is maintained between the first and second outer races 12b and 13b in the same manner as the ninth or tenth embodiment described above. Accordingly, it is possible to dispense with the annular projection 14b or the spacer 15, which has been needed in the prior art. Corresponding to this, it is possible to shorten the width of the bearing device 10. Finally, the thickness of the pivot portion of the swing arm 7 is decreased to improve the thin state of the HDD 1.

Also, in the above-described bearing device 10 (eleventh embodiment) of FIG. 12, the widths of the only first outer race 12b may be shortened by making the race 12b close to the ball 12c. However, instead of this, as shown in FIG. 13, the width of the first outer race 12b is shortended toward the second outer race 13b to form a bearing device 10 (twelfth embodiment).

Figure 13:
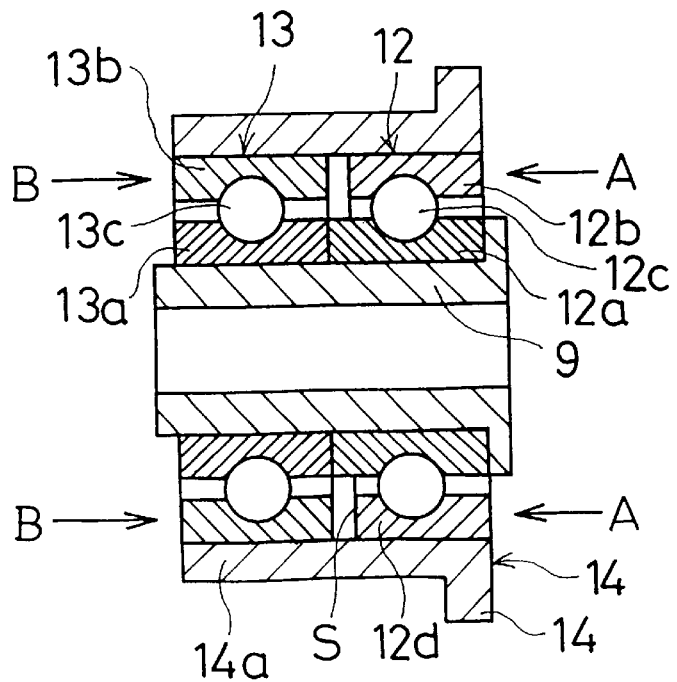
FIG. 13 is a cross-sectional view showing a bearing device according to a twelfth embodiment of the invention.

In the bearing device 10 (twelfth embodiment) of FIG. 13, a space S is formed between the first and second outer races 12b and 13b in the same manner as in the ninth or tenth embodiment described above. Accordingly, it is possible to dispense with the annular projection 14b or the spacer 15, which has been needed in the prior art. Corresponding to this, it is possible to shorten the width of the bearing device 10. Finally, the thickness of the pivot portion of the swing arm 7 is shortened to improve the thin state of the HDD 1.

In the above-described embodiments, the cases where the rolling bearing is the ball bearing are cited. Instead thereof, it is possible to use a rolling bearing.

EXAMPLES

Figure 14A:
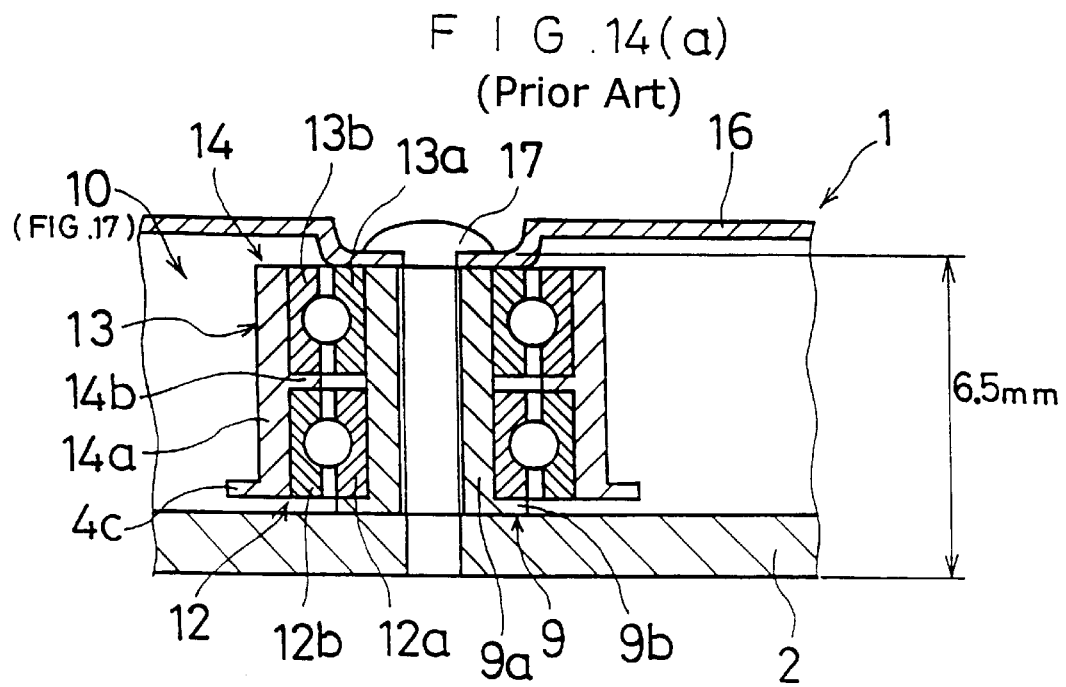
FIG. 14 is a view showing the comparison of an example of the present invention and an example of the prior art.

For reference, as mentioned above, recently, the demand of the super thin-type becomes high. However, as shown in FIG. 14(a), for instance, even if the bearing device 10 of FIG. 17 would be applied to a super thin type HDD 1 having a thickness of 6.5 mm, since the annular projection 14b must be formed on the sleeve 14 and the width (vertical direction in FIG. 14) of the bearing device 10 is increased, a length from the lower portion of the base 2 to the upper portion of the HDD top cover 16 exceeds 6.5 mm. It is difficult to form the 6.5 mm super thin type HDD 1 by using the bearing device 10 of FIG. 17.

Figure 14B:
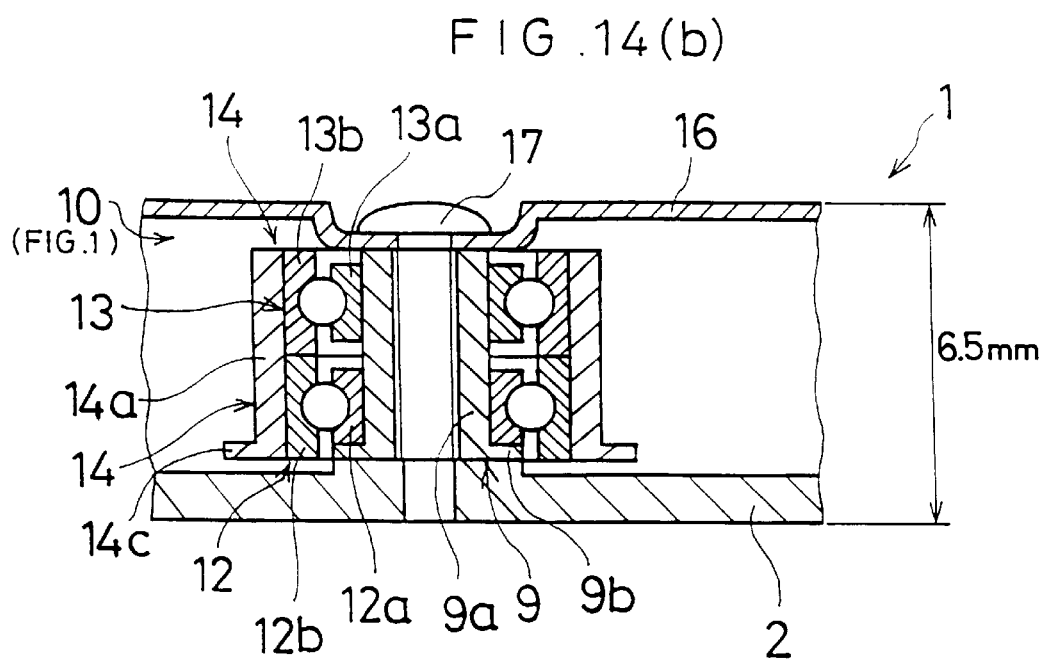
Figure 17:
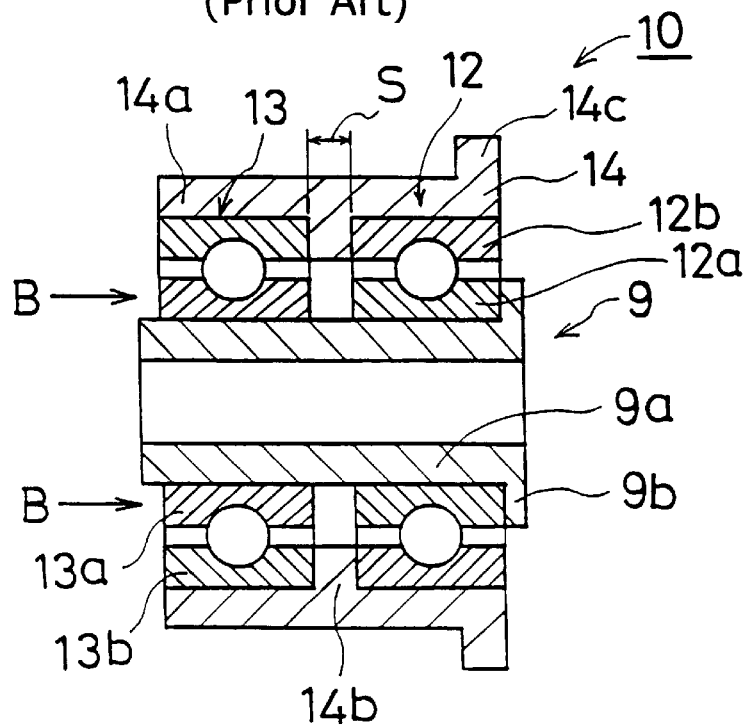
FIG. 17 is a cross-sectional view showing an example of a conventional bearing device.
Figure 18:
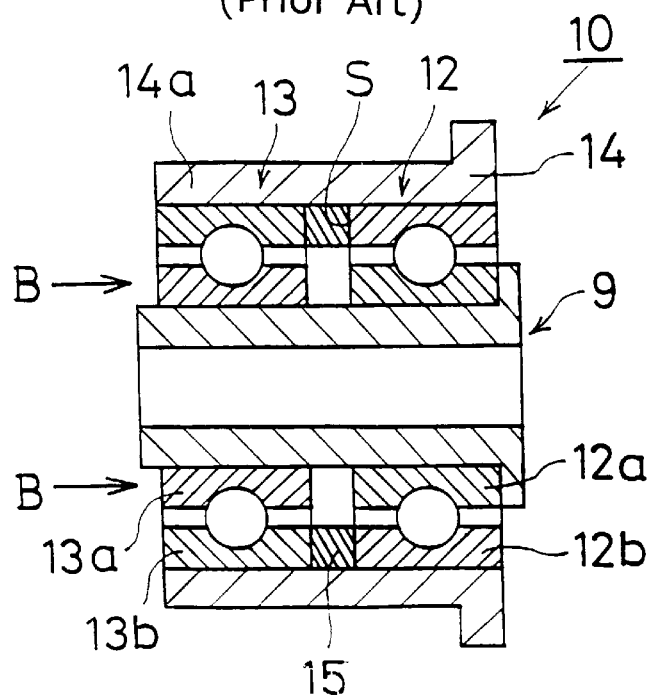
FIG. 18 is a cross-sectional view showing another example of a conventional bearing device.

In contrast, the dimensions of the first and second outer races 12b and 13b are the same as those shown in FIG. 17 to form the bearing device 10 of FIG. 1, and the bearing device 10 is applied to the 6.5 mm super-thin HDD 1. The annular projection 14b is omitted. Corresponding to this, the dimension of the bearing device 10 is decreased. As a result, as shown in FIG. 14(b), the length from the lower surface of the base 2 to the upper portion of the HDD top cover 16 is within 6.5 mm. Thus, it is confirmed that it is possible to use the bearing device 10 of FIG. 1 to realize the making the HDD thin that has been required recently. Reference numeral 17 in FIG. 14 denotes a fastening screw for mounting the HDD top cover 16 on the base 2.

According to the inventions of the claims 1–3, since the width of at least one of the inner races or the outer races of the two rolling bearings is smaller than that of the outer races, and even if the first and second outer races are in contact with each other, a space is kept for applying the pre-pressure to the first and second inner races, by arranging the first and second outer races in contact with each other, the combined width of the first and second rolling bearings, and hence, the width of the bearing device as a whole may be reduced. From this structure, it is possible to dispense with the space or the annular projection, which has been needed in the prior art. It is therefore to shorten the thickness of the pivot portion of the swing arm for which this bearing device is applied, and to make the HDD thin.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What we claim is:

1. A bearing device for a swing-arm provided in a hard disc drive, comprising:

a cylindrical shaft having a flange formed at a first end of the shaft; and a plurality of bearings, each bearing provided with an outer race having first and second ends, an inner race having first and second ends, and a ball held between the inner and outer races, the inner and outer races are aligned in an axial direction of the shaft to form at least a first pair of bearings and a second pair of bearings, wherein said each bearing is coupled to the shaft and the flange of the shaft is bonded to the first end of the inner race of the first pair of bearings, and one of either the outer races and the inner races of respective bearings are bonded to each other and one of either the outer races and the inner races which are not bonded have a spacing therebetween along the axial direction of the shaft and a pre-pressure load is applied to the second end of the non-bonded outer or inner race.

2. The bearing device according to claim 1, wherein a width of at least one of the outer race and the inner race, which are spaced apart from each other along the axial direction of the shaft, is equal to a distance from the ball in a direction transverse to the axial direction.

3. The bearing device according to claim 1, wherein a width of at least one of the outer race and the inner race, which are spaced apart from each other along the axial direction of the shaft, measured from the first end of the inner and outer races to the ball is shorter than a width measured from the second end of the inner and outer races to the ball.

4. The bearing device according to the claim 1, wherein the shaft only contacts an inner peripheral surface of the inner races.

* * * * *

UNITED STATES PATENT AND TRADEMARK OFFICE
CERTIFICATE OF CORRECTION

PATENT NO. : 6,010,247
DATED : January 4, 2000
INVENTOR(S) : Yasuhiro Mouri and Shinichi Mori It is certified that error appears in the above-identified patent and that said Letters Patent is hereby corrected as shown below:

<u>Title page,</u>
Item [12], should read -- Mori et al. --.
Item [75], Inventors, should read -- Yasuhiro Mori; Shinichi Mori, both of Miyota-machi, Japan --.

Signed and Sealed this

Twenty-fourth Day of January, 2006

JON W. DUDAS
*Director of the United States Patent and Trademark Office*